United States Patent [19]
Richards

[11] Patent Number: 5,467,652
[45] Date of Patent: Nov. 21, 1995

[54] APPARATUS AND METHOD FOR DETERMINING RESPONSE PARAMETERS OF A RUNNER TO A START SIGNAL

[76] Inventor: Katy S. Richards, 7611 Concord Dr., Boulder, Colo. 80301

[21] Appl. No.: 176,662

[22] Filed: Jan. 3, 1994

[51] Int. Cl.⁶ ..................................................... G01L 3/24
[52] U.S. Cl. .............................. 73/379.01; 482/8; 482/19
[58] Field of Search ....................... 73/862.621, 862.637, 73/379.01, 379.08, 865.4; 482/8, 19, 901, 902

[56] References Cited

U.S. PATENT DOCUMENTS

| | | | |
|---|---|---|---|
| 2,978,692 | 4/1961 | Riley | 482/19 |
| 3,504,540 | 4/1970 | Pradko et al. | 73/865.4 X |
| 3,724,843 | 4/1973 | Fichter et al. | 482/8 |
| 3,731,298 | 5/1973 | Weidacher | 340/323 R X |
| 4,523,204 | 6/1985 | Bovay | 346/107 B |
| 4,611,803 | 9/1986 | Newton, Jr. | 482/19 |
| 4,906,192 | 3/1990 | Smithard et al. | 482/901 X |
| 4,956,628 | 9/1990 | Furlong | 482/901 X |
| 5,099,689 | 3/1992 | McGinn | 73/379.01 |
| 5,186,062 | 2/1993 | Roost | 73/379.08 X |

FOREIGN PATENT DOCUMENTS 0294786  10/1991  Germany ..................... 482/19

*Primary Examiner*—Richard Chilcot
*Assistant Examiner*—Elizabeth L. Dougherty
*Attorney, Agent, or Firm*—Harold A. Burdick

[57] ABSTRACT

A runners' training apparatus and method are disclosed, the apparatus for measuring pressures exerted on starting blocks by a runner's feet responsive to a start signal and measuring time intervals between the start signal and selected pressure levels developed at the starting block.

20 Claims, 3 Drawing Sheets

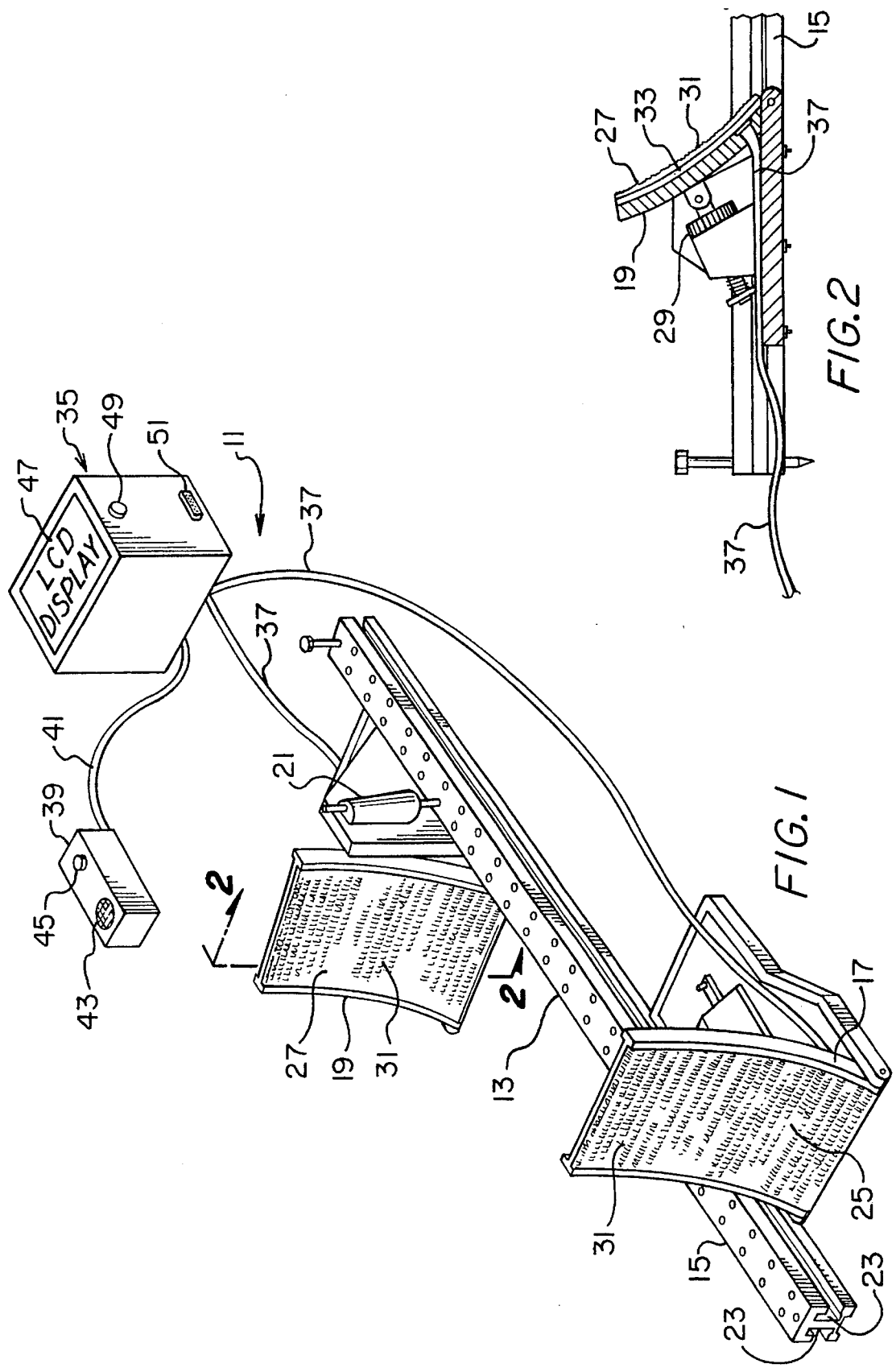

5,467,652

APPARATUS AND METHOD FOR DETERMINING RESPONSE PARAMETERS OF A RUNNER TO A START SIGNAL

FIELD OF THE INVENTION

This invention relates to runners' training devices and methods, and, more particularly, relates to devices and methods for improving runners' starting times and techniques.

BACKGROUND OF THE INVENTION

It is known that many track events, and in particular sprint-type events, are won or lost "in the blocks", i.e., by virtue of the speed and technique of a runner's start. Thus, substantial attention in training is directed to perfecting the runner's starting technique and improving response time out of the runners' starting blocks.

Much of a coach's time and training effort in this area has been, to date, less than scientific, a lack of data regarding a particular runner's weaknesses at the start being at least partly to blame. While videotaping and the like have improved this situation, further aid in the way of developing data relevant to training for race starts could still be utilized.

Runners' starting blocks have been in wide use for some time now, and some improvements thereto have heretofore been suggested and/or utilized for improvement and/or control of race starts. In U.S. Pat. No. 3,731,298, for example, a circuit for detecting false starts is shown in conjunction with a runners' starting plate. Another example is found in U.S. Pat. No. 3,724,843, wherein a starting block assembly is provided which includes leads for a sound generator to assure that each runner in a race is not disadvantaged by the distance of the runner from the starter's pistol and thus receives the start signal at about the same time as the other runners in the race.

None of these devices, however, are adapted for use in training the athlete or for developing better information regarding the athlete's performance in response to the start signal at the beginning of a race.

SUMMARY OF THE INVENTION

This invention provides an apparatus and method used in association with starting blocks utilized by runners at the start of a race which are adapted for developing data relevant to training for race starts. In particular, the apparatus measures and indicates the interval between a race start signal and development of maximum pressure exerted by the foot (or feet) of the runner against the block (or blocks), the actual maximum pressure, and other selected intervals (for example, the interval between the race start signal and the runners release from the block).

The apparatus includes a pressure sensor at the starting block for sensing pressure levels applied to the starting block by the runner, and an indicator connected with the pressure sensor for indicating a response parameter of the runner based upon the sensed pressure levels. An input for receiving an indication of the start signal is provided, and timing means is connected with the pressure sensor and input for interval determination between the start signal and maximum pressure applied to the block by the runner. The apparatus may be entirely housed in the starting block assembly or may be cabled thereto (excepting the pressure sensor) from a remote location.

The method includes the steps of sensing a plurality of pressure levels applied to a starting block by the runner and indicating a response parameter of a runner based on the sensed pressure levels.

It is therefore an object of this invention to provide apparatus and methods for improving training for track athletes, and in particular training directed to improving runners' starting times and techniques.

It is another object of this invention to provide an apparatus and method used in association with starting blocks utilized by runners at the start of a race which are adapted for developing data relevant to training for race starts.

It is still another object of this invention to provide an apparatus and method for measuring and indicating a response parameter of a runner to a race start signal based on runner applied pressures sensed at a starting block.

It is yet another object of this invention to provide an apparatus and method for measuring and indicating the interval between a race start signal and development of maximum pressure exerted by the foot (or feet) of a runner against a starting block (or blocks).

It is yet another object of this invention to provide an apparatus and method for measuring and indicating the maximum pressure exerted by the foot (or feet) of a runner against a starting block (or blocks) responsive to a starting signal.

It is still another object of this invention to provide an apparatus and method for measuring and indicating a variety of selected intervals between a race start signal and release of a runner from the starting blocks.

It is yet another object of this invention to provide an apparatus used with a starting block for determining response parameters of a runner to a start signal that includes a pressure sensor at the starting block for sensing pressure levels applied to the starting block by the runner, and an indicator connected with the pressure sensor for indicating a response parameter of the runner based on the sensed pressure levels.

It is yet another object of this invention to provide an apparatus used with a starting block for determining response parameters of a runner to a start signal that includes a pressure sensor at the starting block for sensing pressure applied to the block by the runner, an input for receiving an indication of the start signal, and timing means connected with the pressure sensor and input for interval determination between the start signal and maximum pressure applied to the block by the runner.

It is another object of this invention to provide a runners' starting block including first and second relatively positionable blocks, a pressure sensor at at least one of the blocks for sensing pressure applied to the block by a runner, an input for receiving an indication of a race start signal, and a timer connected with the pressure sensor and the input for interval determination between the indication of the start signal and maximum sensed pressure applied to the block by the runner.

It is still another object of this invention to provide a method for determining selected response parameters of a runner in response to a start signal which includes the steps of sensing a plurality of pressure levels applied to a starting block by the runner and indicating a response parameter of a runner based on the sensed pressure levels.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view illustration of the apparatus of this invention;

FIG. 2 is a partial sectional view taken at section lines 2—2 of FIG. 1 and illustrating a pressure sensing mechanism utilized in the apparatus of this invention;

DESCRIPTION OF THE INVENTION

Figure 3:
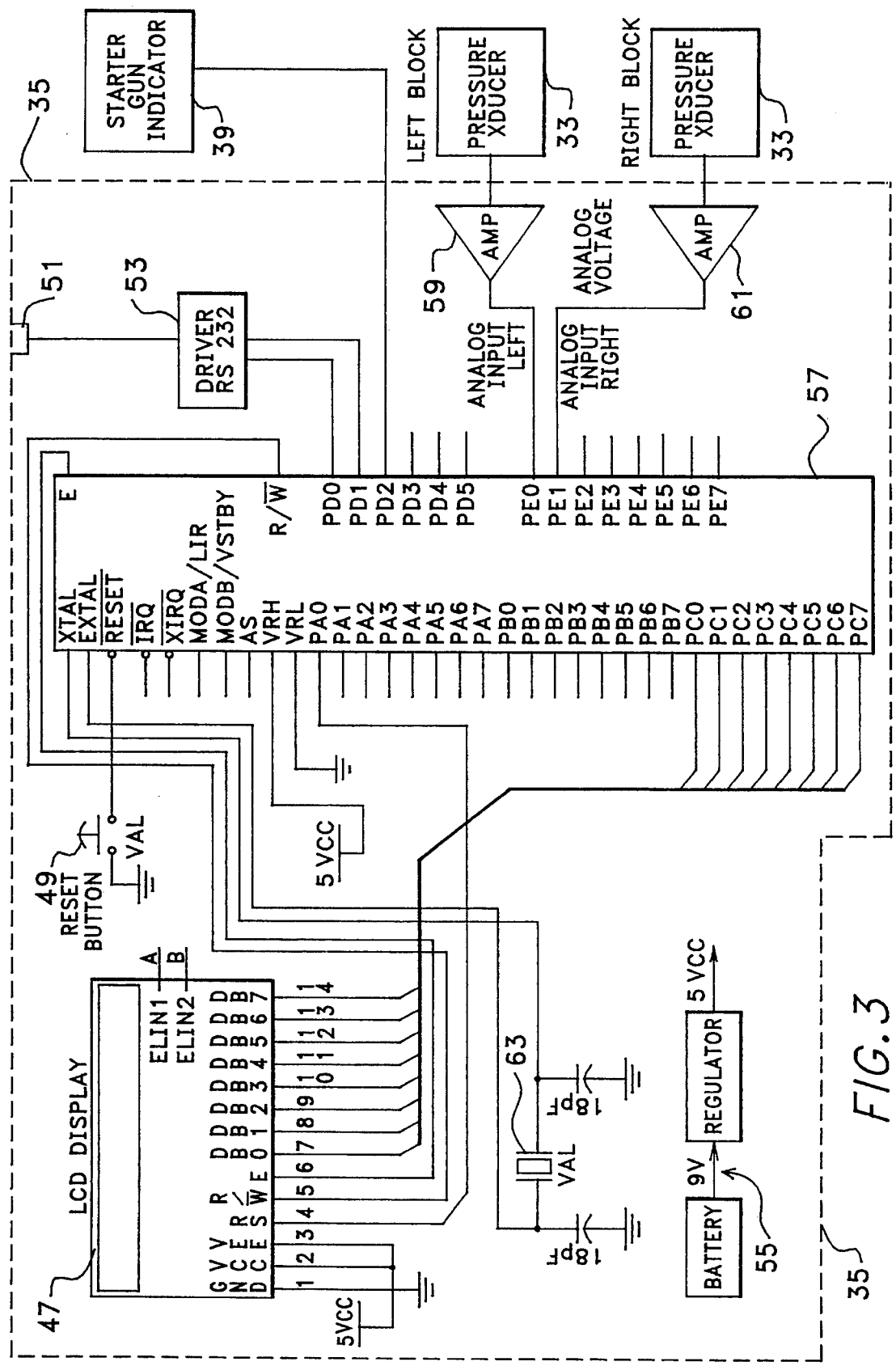
FIG. 3 is a block/schematic diagram of the apparatus of this invention.

Apparatus 11 of this invention, which may include an entire starting block assembly 13 or be provided for use with such assembly, for example by retrofitting, is shown in FIGS. 1 and 2. Starting block assembly 13 is of a known variety with the exceptions noted herein for adaptation to the assembly of this invention, and includes anchor bar 15 having left and right blocks 17 and 19 adjustably (for both relative spacing at pins 21 (one shown) and slide channels 23 and pitch of foot bearing block faces 25 and 27 at angle adjusting mechanism 29) associated therewith.

Blocks 17 and 19 both include a durable padded cover 31 (as shown in FIG. 2 for block 19, cover 31 being made of rubber, pliable vinyl, plastic or the like and configured to provide traction) at faces 25 and 27, the covers being secured to the blocks at the edges thereof utilizing any suitable means providing a durable securement. Beneath each of the covers, and between the covers and the respective block, pressure sensitive elastomer pads 33 are positioned and secured (as shown in FIG. 2 for block 19, an identical arrangement being utilized at block 17).

Pressure pads 33 are of a size sufficient to cover substantially the entire front surface of blocks 17 and 19, and are of a known conductive elastomer construction, such pads being in wide use, for example in keyboards, scales, running shoes, and the like. When selecting a particular pad for the use herein contemplated, a relatively sensitive pad should be used (such pads come in a wide variety ranging from highly sensitive pads for use in measuring devices such as scales to less sensitive pads for other uses). While the use of pressure sensitive pads is shown herein, it should be realized that any number of other arrangements, such as known pressure sensors or transducers, strain gauges and the like, could be adapted for use with this invention.

Pads 33 are connected to control and display module 35 by electrical cables 37. Starting signal, or gun, indicator 39 is connected to module 35 by electrical cable 41. Starting signal indicator 39 may include a sound generator having built in speaker 43 for generating an audible start signal and a pulse generating circuit for simultaneously generating a pulse indicative of the start signal to the circuitry housed in module 35, both in response to actuation at switch 45. Alteratively, indicator 39 could be a sound sensor for sensing a start signal and transmitting the pulse to the circuitry of module 35.

While separate modules are illustrated herein, it should be appreciated that module 35 and/or indicator 39 could be housed in or connected with blocks 17 and/or 19, and that indicator 39 could be integral to module 35.

Turning to FIG. 3, module 35 includes liquid crystal display 47 (a 4 line, 20 character display would be more then sufficient for this application), reset button 49, auxiliary output connector 51 connected with RS232 driver 53 (for example, a MAX 233 by Maxim Co., for stored data print out or other stored data transfer), and battery pack 55 (providing a regulated 5 volt d.c. output to the circuits) all coupled with microprocessor 57 (for example, a Motorolla MC68HC11E9 8 bit microprocessor having 0.5K memory and 12K ROM) as shown.

Indicator 39 is connected with processor 57 for receipt of the start signal indication pulse. Pressure pad sensors 33 are connected, one each, to amplifiers 59 and 61 which provide a variable analog output voltage which varies in proportion to the pressure sensed at pad sensors 33 due to a runner's feet engaging the blocks. The amplifiers are in turn connected to processor 57. Crystal 63 (for example, an 8 Mhz clock) is connected with processor 57.

As may be appreciated, this arrangement provides, under program control as discussed hereinafter, an apparatus capable of measuring, recording in memory and displaying 1) pressure levels sensed at either starting block face 25 or 27 due to a runner engaging the blocks with his or her feet (i.e., using the blocks as intended), 2) times elapsed (i.e., intervals) between selected events such as receipt of the indication of the start signal and various sensed pressure levels such as maximum, or peak, exerted pressure (i.e., the beginning of a negative sloping pressure) and/or minimum exerted pressure indicating a runner's release from a block (i.e., 0 pressure) at either the left or right block, and 3) false starts (i.e., a negative sloping pressure before receipt of the indication of the start signal). More regular periodic measurement of pressure levels at either block could be taken and recorded in memory to provide complete profiles of pressures exerted by the athlete at either block in response to the start signal and through the runner's release from the blocks.

Figure 4:
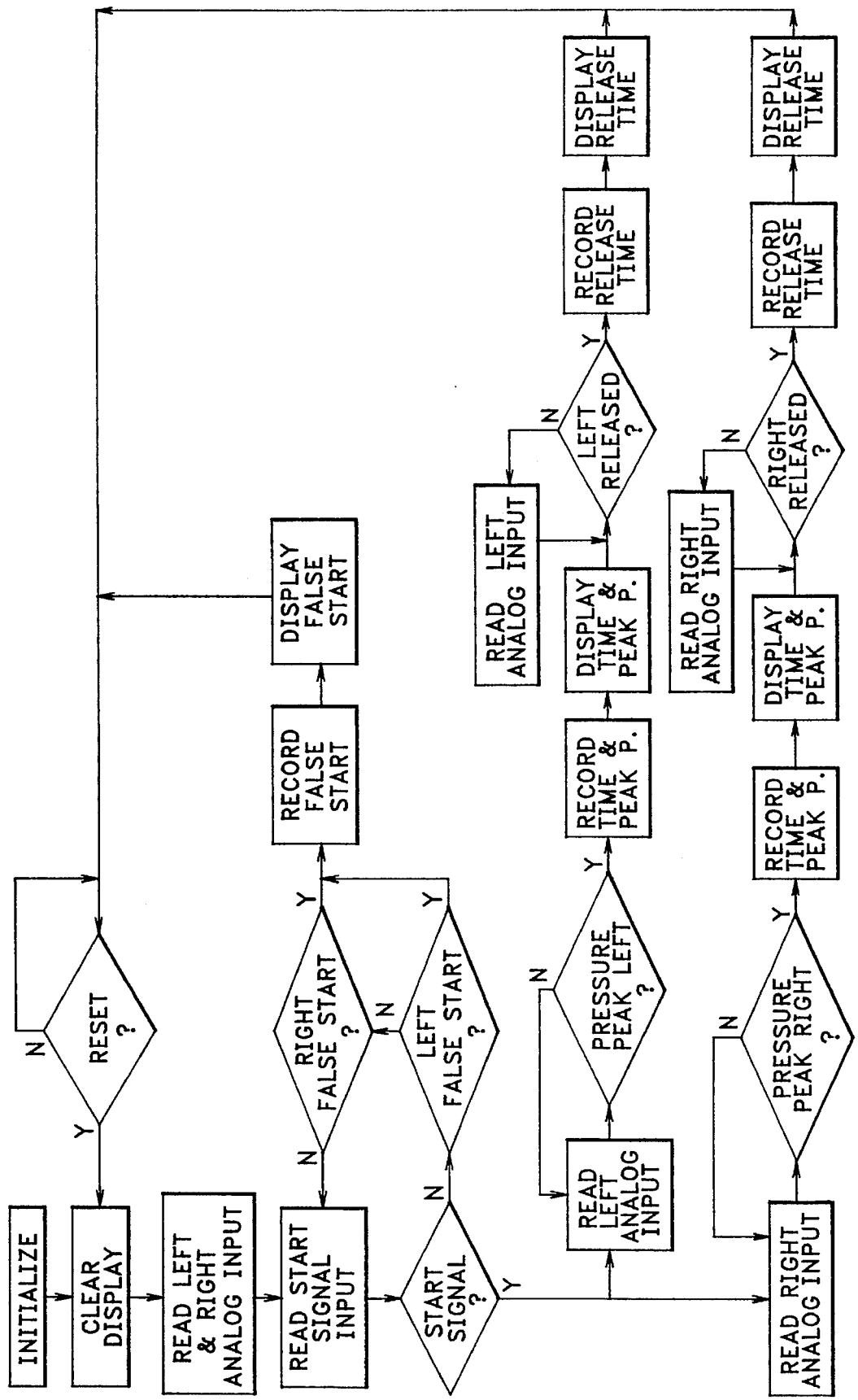
FIG. 4 is a flow chart illustrating program control of the apparatus of this invention.

In particular, as shown if FIG. 4, it is preferred that the device be programmed to at least record and display a value indicative of maximum pressure exerted by a training runner at both blocks 17 and 19, the time between the receipt of the start signal indication and sensing of the maximum pressure at block 17 and at block 19 (each independently), the time between the receipt of the start signal indication and sensing of minimum pressure indicating a runner's release from block 17 and from block 19 (each independently), and sensed false starts. Further program control could be provided for more detailed interval measurements where profiling is desired. Measurement of the 2 intervals above identified, at both left and right blocks, makes available data for many other intervals of interest, such as the time between maximum exerted pressure and minimum exerted pressure at each foot, the time from the start signal to release from the blocks, the time between development of maximum pressure at the left foot and at the right foot, the time between left and right foot release from their respective blocks, and the like.

As may be appreciated, a new and useful runners' training apparatus and method are provided by this invention.

What is claimed is:

1. An apparatus for use with a starting block for determining response parameters of a runner to a start signal comprising:

pressure sensing means at the starting block for sensing a plurality of pressure levels applied to the starting block by the runner and providing an output signal indicative of sensed pressure levels;

processing means connected with said pressure sensing means to receive said output signal for processing said signal to measure a time interval from at or after the start signal to the occurrence of at least one of said plurality of pressure levels; and indicating means connected with said processing means for indicating at least said time interval measurement.

2. The apparatus of claim 1 wherein said processing means processes said signal to determine a measurement of said at least one of said plurality of pressure levels, and wherein said indicating means indicates said measurement of said at least one of said plurality of pressure levels.

3. The apparatus of claim 1 further comprising input means connected with said processing means for receiving an indication of the start signal, said processing means including timing means for said time interval determination, said at least one of said plurality of pressure levels being maximum sensed pressure applied to the starting block by the runner after the start signal.

4. The apparatus of claim 1 wherein said processing means further processes said signal to provide an indication to said indicating means when a sensed pressure level occurring prior to the start signal indicates a false start.

5. The apparatus of claim 1 wherein said indicating means is any of an electronic alphanumeric display, an output connectable with a printout device, and memory associated with said processing means.

6. The apparatus of claim 1 wherein said processing means processes said signal to measure a second time interval from at or after the start signal to a minimum sensed pressure at said starting block indicating the runner's release from the block, and wherein said indicating means indicates said second time interval measurement.

7. The apparatus of claim 1 wherein there are first and second blocks, said pressure sensing means including first and second pressure sensors, one each at the first and second blocks, for separately sensing a plurality of selected pressure levels applied to each of the blocks by the runner.

8. A runners' starting block assembly comprising:

first and second relatively positionable blocks;

pressure sensing means at at least one of said blocks for sensing pressure applied to said at least one of said blocks by a runner and providing an output signal indicative thereof;

input means for receiving an indication of a race start signal;

timing means connected with said pressure sensing means and said input means for utilizing said output signal and said indication of a start signal to measure a time interval between said indication of the start signal and maximum sensed pressure applied to said at least one of said blocks by the runner; and memory means associated with said timing means for storing data indicative of at least said time interval measurement.

9. The assembly of claim 8 further comprising indicating means for indicating said time interval measurement to a user of said assembly.

10. The assembly of claim 8 further comprising indicating means for indicating said maximum sensed pressure.

11. The assembly of claim 8 further comprising false start indicating means for indicating an early start by the runner before said indication of a race start signal and based on sensed pressure from said pressure sensing means.

12. The assembly of claim 8 wherein said pressure sensing means is at both said first and second blocks for separately sensing pressure applied to each of said blocks.

13. The assembly of claim 8 wherein said timing means includes a microprocessor connected with said pressure sensing means and said input means for processing said output signal and said indication of a start signal to provide data output to said memory means indicative of said time interval measurement and said sensed pressure at said pressure sensing means.

14. A method for determining selected response parameters of a runner in response to a start signal comprising the steps of:

sensing and providing a signal indicative of a plurality of pressure levels applied to a starting block by the runner; and processing said signal to determine a response time parameter of a runner based on said sensed pressure levels that occur after the start signal.

15. The method of claim 14 wherein one of said pressure levels is maximum pressure applied to the starting block by the runner after the start signal, said processing means providing a measurement of said maximum pressure.

16. The method of claim 14 further comprising the step of receiving an indication of the start signal, the step of processing said signal including measuring the time interval between said indication of the start signal and maximum sensed pressure applied to the starting block by the runner after said indication.

17. The method of claim 14 wherein said response time parameter is an interval between the start signal and either of maximum applied pressure and minimum applied pressure.

18. The method of claim 14 further comprising the steps of storing data indicative of said sensed pressure levels and said response time parameter in memory and selectively displaying said data.

19. The method of claim 14 further comprising indicating a measurement of said response time parameter at an alphanumeric display.

20. The method of claim 14 wherein the step of sensing a plurality of applied pressure levels includes the step of separately sensing said pressure levels at first and second starting blocks.

* * * * *